United States Patent [19]

Yoshizawa et al.

[11] Patent Number: 4,918,555
[45] Date of Patent: Apr. 17, 1990

[54] MAGNETIC HEAD CONTAINING AN FE-BASE SOFT MAGNETIC ALLOY LAYER

[75] Inventors: Yoshihito Yoshizawa; Kiyotaka Yamauchi, both of Kumagaya; Toshikazu Nishiyama, Fukaya; Shigekazu Suwabe, Kumagaya, all of Japan

[73] Assignee: Hitachi Metals, Ltd., Tokyo, Japan

[21] Appl. No.: 223,843

[22] Filed: Jul. 25, 1988

[30] Foreign Application Priority Data

Jul. 23, 1987 [JP] Japan .................. 62-183876
Jul. 23, 1987 [JP] Japan .................. 62-183877

[51] Int. Cl.$^4$ ............................. G11B 5/147
[52] U.S. Cl. ..................... 360/125; 360/126; 148/307
[58] Field of Search ............ 360/125, 126, 127; 148/302, 306, 307, 310, 311; 428/681, 900

[56] References Cited

U.S. PATENT DOCUMENTS

| | | | |
|---|---|---|---|
| 4,608,297 | 8/1986 | Shimada et al. | 360/125 |
| 4,748,000 | 5/1988 | Hayashi et al. | 148/307 |
| 4,762,755 | 8/1988 | Shiiki et al. | 148/307 |

FOREIGN PATENT DOCUMENTS

| | | |
|---|---|---|
| 58-12120 | 1/1983 | Japan ............ 360/126 |
| 58-28341 | 6/1983 | Japan . |
| 59-100254 | 6/1984 | Japan . |
| 62-101008 | 5/1987 | Japan . |

OTHER PUBLICATIONS

Shibatani et al, NHK Technical Report, vol. 29 (2), pp.51-106 (1977).
Hirota et al, Kino Zairyo (Functional Material), Aug. 1986, p. 68.

Primary Examiner—John H. Wolff
Attorney, Agent, or Firm—Sughrue, Mion, Zinn, Macpeak & Seas

[57] ABSTRACT

A magnetic head having at least one magnetic gap in its magnetic path, which comprises an Fe-base solf magnetic alloy layer in the magnetic path, at least 50% of the structure of said alloy layer consisting of fine crystalline particles having a body-centered cubic structure and an average particle size of 500 Å or less.

20 Claims, 5 Drawing Sheets

MAGNETIC HEAD CONTAINING AN FE-BASE SOFT MAGNETIC ALLOY LAYER

BACKGROUND OF THE INVENTION

The present invention relates to a magnetic head having good soft magnetic properties.

In magnetic recording and reproducing apparatuses in audiotape recorders, video tape recorders, memory apparatuses of computers, etc., recorded signals have recently been getting higher in density and quality. For higher recording density, metal tapes, vapor deposited tapes, magnetic disks have been developed in which alloy powder composed of Fe, etc. is used as a magnetic recording medium powder. Such magnetic recording media should have high coercivity.

In order that the magnetic recording media having high coercivity can exhibit their own characteristic advantages sufficiently, magnetic heads used for recording should have high saturation magnetic flux densities. Further, when reproduction and recording are conducted by the same heads, cores having high permeability are necessary for such magnetic heads.

However, ferrites conventionally used as core materials have low saturation magnetic flux densities. On the other hand, Permalloy does not have sufficient wear resistance.

Recently, thin layers of an Fe-Al-Si alloy or a Co-Nb-Zr amorphous alloy for magnetic heads have been proposed. The use of such thin layers is reported, for instance, by Shibatani et al. NHK Technical Report Vol. 29 (2), pp. 51-106 (1977), and Hirota et al., Kino Zairyo (Functional Material) Aug. 1986, p. 68.

However, in the Fe-Al-Si alloy thin layer, both magnetostriction λs and crystal magnetic anisotropy K should be almost zero to obtain high permeability, and the Fe-Al-Si alloy having such composition as to show zero magnetostriction and magnetic anistropy has a saturation magnetic flux density of at most 10-11 kG.

On the other hand, the Co-Nb-Zr amorphous alloy layer having magnetostriction λs of nearly zero has a saturation magnetic density of at most 12 kG or so.

An alloy layer having a higher saturation magnetic density is now desired for higher recording density, but a sufficiently high saturation magnetic flux density cannot be achieved. Further, attempts have been made to provide an Fe-Si alloy layer having small magnetostriction at high magnetic flux density. In such an alloy layer, when its magnetostriction λs is zero, its saturation magnetic flux density is about 17.6 kG, higher than those of the above-mentioned alloy layers. However, if its corrosion resistance is intended to be increased, the saturation magnetic flux density of the Fe-Si alloy layer further decreases.

In the meantime, it is required nowadays that a recording medium can have high coercivity and further has high-frequency magnetic characteristics at a high saturation magnetic flux density for high-density recording.

As other alloys having small magnetostriction and high saturation magnetic flux density, Fe-B solid solution alloys described in Japanese Patent Publication No. 58-28341 and Japanese Patent Laid-Open No. 59-100254 are known.

Such alloys are in the form of continuous filament produced by ejecting a melt composed of Fe and B onto a fast rotating surface to rapidly quench the melt at a cooling rate of about $10^4$–$10^{6°}$ C./sec. They have saturation magnetization of about 20 kG. These alloys are reportedly suitable for transformers.

However, the Fe-B ribbons produced by such a liquid quenching method are generally difficult to be made thinner than 10 μm and do not have sufficient permeability at high frequency. Also, they do not have sufficient wear resistance and corrosion resistance, which make them unsuitable for magnetic heads, etc.

In addition, such alloys having high saturation magnetic flux densities tend to have low crystallization temperatures, so that crystallization takes place easily if they are kept at temperatures of 500° C. or more for a long period of time in the glass bonding process, causing the deterioration of the magnetic properties. Therefore, their processing conditions are limited.

OBJECT AND SUMMARY OF THE INVENTION

Therefore, an object of the present invention is to provide a magnetic head having an Fe-base soft magnetic alloy layer having a high saturation magnetic flux density and excellent soft magnetic properties which are hardly deteriorated by mass bonding at 500° C. or more.

Thus, the magnetic head according to the present invention has at least one magnetic gap in its magnetic path, comprising an Fe-base soft magnetic alloy layer in the magnetic path, at least 50% of whose alloy structure consists of fine crystalline particles having a body-centered cubic structure and an average particle size of 500Å or less.

This Fe-base soft magnetic alloy layer can be produced by a sputtering method, an ion plating method, a vapor deposition method, a cluster ion beam method, etc.

BRIEF DESCRIPTION OF THE DRAWINGS

FIG. 4 (a) is a graph showing the X-ray pattern of the alloy layer of the present invention before heat treatment;

FIG. 4 (b) is a graph showing the X-ray pattern of the alloy layer of the present invention after heat treatment.

DETAILED DESCRIPTION OF THE INVENTION

An Fe-base soft magnetic alloy layer in the magnetic head of the present invention has the composition of:

wherein L is at least one element selected from the group consisting of Ti, Zr, Hf, V, Nb, Ta, Cr, W, Mn, Ru, Rh, Pd, Os, Ir and Pt, and u and v respectively satisfy the following relations:

$2 \leq u \leq 10, 0 \leq v \leq 10.$

B is an indispensable element for controlling magnetostriction and reducing the deterioration of magnetic properties due to strain.

The element L serves to improve wear resistance and corrosion resistance of the alloy layer, thereby providing the alloy layer of the magnetic head with well balanced characteristics.

The content of B(u) is limited to 2-10 atomic %, because if otherwise the alloy layer would have poor soft magnetic properties. The content of L(v) is limited to 0-10 atomic %, because if otherwise the alloy layer would have an extremely decreased saturation magnetic flux density. Particularly when L is Ru, high wear resistance can be achieved.

The crystalline particles in the alloy structure should have a particle size of 500Å or less, because if it exceeds 500Å the alloy layer's permeability undesirably decreases. The particularly preferred particle size is 50-200Å.

Another alloy layer in the magnetic head of the present invention has the composition of:

$$Fe_{100-u-v-w}B_uL_vX_w$$

wherein L is at least one element selected from the group consisting of Ti, Zr, Hf, V, Nb, Ta, Cr, W, Mn, Ru, Rh, Pd, Os, Ir and Pt, X is at least one element selected from the group consisting of C, Si, Ge, Ga, Al, In and Sn, and u, v and w respectively satisfy the following relations:

$$2 \leq u \leq 10, \ 0 \leq v \leq 10, \ 0 \leq w \leq 10.$$

In this alloy layer, the crystalline particles in the alloy structure have a particle size of 500Å or less when measured by their maximum sizes, and they have a body-centered cubic structure. Since such alloy layer has a high saturation magnetic flux density, high magnetostriction and excellent permeability, it is highly suitable for the magnetic head.

In the above alloy layer, the element X serves to control magnetostriction and crystal magnetic anisotropy.

Particularly when $0.5 \leq y \leq 5$ and $z \leq 5$, the alloy layer is provided with high saturation magnetic flux density, wear resistance and corrosion resistance, so that it is suitable for the magnetic head of the present invention.

A further alloy layer in the magnetic head of the present invention has the composition represented by the general formulas:

$$(Fe_{1-a}M_a)_{100-x-y-z-\alpha-\beta-\gamma}A_xSi_yB_zM'_\alpha M''_\beta X_\gamma$$

wherein M is Co and/or Ni, M' is at least one element selected from the group consisting of Nb, W, Ta, Zr, Hf, Ti and Mo, M" is at least one element selected from the group consisting of V, Cr, Mn, Al, elements in the platinum group, Sc, Y, rare earth elements, Au, Zn, Sn, Re, Mg, Ca, Sr, Ba, Na, K and Rb, A is Cu and/or Ag, X is at least one element selected from the group consisting of C, Ge, P, Ga, Sb, In, Be, As and N, and a, x,y,z,$\alpha$,$\beta$ and $\gamma$ respectively satisfy $0 \leq a < 0.5$, $0.1 \leq x \leq 10$, $0 \leq y \leq 30$, $0 \leq z \leq 25$, $0 \leq y+z+\gamma \leq 35$, $0.1 \leq \alpha \leq 30$, $0 \leq \beta \leq 15$, $0 \leq \gamma \leq 20$, at least 50% of the alloy structure being fine crystalline particles having an average particle size of 500Å or less.

In the Fe-base soft magnetic alloy layer of the present invention, Fe may be substituted by Co and/or Ni in the range from 0 to less than 0.5. However, to have good magnetic properties such as low core loss and magnetostriction, the content of Co and/or Ni which is represented by "a" is preferably 0-0.3. Particularly to provide a low-magnetostriction alloy, the range of "a" is preferably 0-0.1.

In the present invention, Cu and/or Ag is an indispensable element, and its content "x" is 0.1-10 atomic %. When it is less than 0.1 atomic %, substantially no effect on the reduction of core loss and on the increase in permeability can be obtained by the addition of Cu and/or Ag. On the other hand, when it exceeds 3 atomic %, the alloy's core loss become larger than those containing no Cu and/or Ag, reducing the permeability, too. The preferred content of Cu and/or Ag in the present invention is 0.5-2 atomic %, in which range the core loss is particularly small and the permeability is high.

The reasons why the core loss decreases and the permeability increases by the addition of Cu and/or Ag are not fully clear, but it may be presumed as follows:

Since Cu and/or Ag and Fe have a positive interaction parameter, their solubility is low. Accordingly, since iron atoms or copper and/or silver atoms tend to gather to form clusters, thereby producing compositional fluctuation. This produces a lot of domains likely to be crystallized to provide nuclei for generating fine crystalline particles. These crystalline particles are based on Fe, and since Cu and/or Ag is substantially not soluble in Fe, Cu and/or Ag is ejected from the fine crystalline particles, whereby the Cu and/or Ag content in the vicinity of the crystalline particles becomes high. This presumably suppresses the growth of crystalline particles.

Because of the formation of a large number of nuclei and the suppression of the growth of crystalline particles by the addition of Cu and/or Ag, the crystalline particles are made fine, and this phenomenon is accelerated by the inclusion of Nb, Ta, W, Mo, Zr, Hf, Ti, etc.

Without Nb, Ta, W, Mo, Zr, Hf, Ti, etc., the crystalline particles are not fully made fine and thus the soft magnetic properties of the resulting alloy are poor. Particularly Nb and Mo are effective, and particularly Nb acts to keep the crystalline particles fine, thereby providing excellent soft magnetic properties. And since a fine crystalline phase based on Fe is formed, the Fe-base soft magnetic alloy layer of the present invention has smaller magnetostriction than Fe-base amorphous alloys, which means that the Fe-base soft magnetic alloy layer of the present invention has smaller magnetic anisotropy due to internal stress-strain, resulting in improved soft magnetic properties. In addition, the reduction of the particle size of the crystalline particles leads to the reduction of magnetic anisotropy to almost zero.

Without the addition of Cu and/or Ag, the crystalline particles are unlikely to be made fine. Instead, a compound phase is likely to be formed and crystallized, thereby deteriorating the magnetic properties.

Si and B are elements particularly for making fine the alloy structure. The Fe-base soft magnetic alloy layer of the present invention is desirably produced by once forming an amorphous alloy with the addition of Si and B, and then forming fine crystalline particles by heat treatment.

The content of Si ("y") and that of B ("z") are $0 \leq y \leq 30$ atomic %, $0 \leq z \leq 25$ atomic %, and $0 \leq y+z+\gamma \leq 35$ atomic %, because the alloy would have an extremely reduced saturation magnetic flux density if otherwise.

When the amount of the other amorphous-forming element is small, the alloy can be easily made amorphous if $y+z+\gamma$ is 10-35 atomic %. Specifically, when $0.1 \leq \alpha \leq 10$, $10 \leq y+z+\gamma \leq 35$. On the other hand, when $10 \leq \alpha \leq 30$, $0 \leq y+z+\gamma \leq 10$.

In the present invention, M', when added together with Cu and/or Ag, acts to make the precipitated crystalline particles fine. M' is at least one element selected from the group consisting of Nb, W, Ta, Zr, Hf, Ti and Mo. These elements have a function of elevating the crystallization temperature of the alloy, and synergistically with Cu and/or Ag having a function of forming clusters and thus lowering the crystallization temperature, it suppresses the growth of the precipitated crystalline particles, thereby making them fine.

The content of M' ($\alpha$) is 0.1-30 atomic %. When it is less than 0.1 atomic %, sufficient effect of making crystalline particles fine cannot be obtained, and when it exceeds 30 atomic % an extreme decrease in saturation magnetic flux density ensues. The preferred content of M' is 2-8 atomic %, in which range particularly excellent soft magnetic properties are obtained. Incidentally, most preferable as M' is Nb and/or Mo, and particularly Nb in terms of magnetic properties. The addition of M' provides the Fe-base soft magnetic alloy with as high permeability as that of the Co-base, high-permeability materials.

M", which is at least one element selected from the group consisting of V, Cr, Mn, Al, elements in the platinum group, Sc, Y, rare earth elements, Au, Zn, Sn, Re, Mg, Ca, Sr, Ba, Na, K and Rb, may be added for the purpose of improving corrosion resistance or magnetic properties and of adjusting magnetostriction, but its content is at most 15 atomic %. When the content of M" exceeds 15 atomic %, an extremely decrease in a saturation magnetic flux density ensues. A particularly preferred amount of M" is 10 atomic % or less.

Among them, at least one element selected from the group consisting of Ru, Rh, Pd, Os, Ir, Pt, Au, Cr and V is capable of providing the alloy with particularly excellent corrosion resistance and wear resistance, thereby making it suitable for magnetic heads, etc.

The alloy of the present invention may contain 20 atomic % or less of at least one element X selected from the group consisting of C, Ge, P, Ga, Sb, In, Be, As and N. These elements are effective for making amorphous, and when added with Si and B, they help make the alloy amorphous and also are effective for adjusting the magnetostriction and Curie temperature of the alloy.

In sum, in the Fe-base soft magnetic alloy layer having the general formula:

$(Fe_{1-a}M_a)_{100-x-y-z-\alpha-\beta-\gamma}Cu_xSi_yB_zM'_\alpha M''_\beta X_\gamma$, the general ranges of a, x, y, z, $\alpha$, $\beta$ and $\gamma$ are

| |
|---|
| $0 \leq a < 0.5$ |
| $0.1 \leq x \leq 10$ |
| $0 \leq y \leq 30$ |
| $0 \leq z \leq 25$ |
| $0 \leq y + z + \gamma \leq 35$ |
| $0.1 \leq \alpha \leq 30$ |
| $0 \leq \beta \leq 15$ |
| $0 \leq \gamma \leq 20$, | and the preferred ranges are

| |
|---|
| $0 \leq a \leq 0.3$ |
| $0.5 \leq x \leq 2$ |
| $8 \leq y \leq 23$ |
| $3 \leq z \leq 18$ |
| $18 \leq y + z \leq 26$ |
| $2 \leq \alpha \leq 8$ |
| $\beta \leq 5$ |
| $\gamma \leq 5$. |

The Fe-base soft magnetic alloy layer having the above composition according to the present invention has an alloy structure, at least 50% of which consists of fine crystalline particles. These crystalline particles are based on $\alpha$-Fe having a bcc structure, in which Si and B, etc. are dissolved. These crystalline particles have an extremely small average particle size of 500Å or less, and are uniformly distributed in the alloy structure. Incidentally, the average particle size of the crystalline particles is determined by measuring the maximum size of each particle and averaging them. When the average particle size exceeds 500Å, good soft magnetic properties are not obtained. It is preferably 200Å or less, more preferably 50-200Å. The remaining portion of the alloy structure other than the fine crystalline particles is mainly amorphous. Even with fine crystalline particles occupying substantially 100% of the alloy structure, the Fe-base soft magnetic alloy of the present invention has sufficiently good magnetic properties.

The Fe-base soft magnetic alloy layer is generally as thick as 20 $\mu$m or less to show good magnetic properties at a usable frequency. This alloy layer can be used as a single layer, but if necessary, it may be laminated with a nonmagnetic layer such as $SiO_2$ or with a ferromagnetic layer such as Sendust. When laminated with a nonmagnetic layer alternately, fine crystalline particles are easily generated by heat treatment, and the alloy layer exhibits excellent high-frequency characteristics.

Next, the method of producing the Fe-base soft magnetic alloy layer of the present invention will be explained in detail below.

The Fe-base soft magnetic alloy layer can be produced by first forming an amorphous alloy layer by gas phase rapid quenching methods such as a sputtering method, a vapor deposition method, etc. and then heat-treating it. By heating a substrate on which the alloy layer is to be formed, the Fe-base soft magnetic alloy layer having a fine crystalline structure can be directly produced.

The heat treatment is carried out by heating the amorphous alloy layer in vacuum or in an inert gas atmosphere such as hydrogen, nitrogen, argon, etc. The temperature and time of the heat treatment varies depending upon the composition of the amorphous alloy layer, etc., but in general it is heated at a temperature higher than its crystallization temperature. Specifically, it is preferably 450°-700° C. for 5 minutes to 24 hours. When the heat treatment temperature is lower than 450° C., crystallization is unlikely to take place with ease, requiring too much time for the heat treatment. On the other hand, when it exceeds 700° C., coarse crystalline particles tend to be formed, making it difficult to obtain fine crystalline particles. And with respect to the heat treatment time, when it is shorter than 5 minutes, it is difficult to heat the alloy layer at uniform temperature, providing uneven magnetic properties, and when it is longer than 24 hours, productivity becomes too low and also the crystalline particles grow excessively resulting in the deterioration of magnetic properties. The preferred heat treatment conditions are, taking into consideration practicality and uniform temperature control, etc., 500°–650° C. for 5 minutes to 6 hours.

The heat treatment atmosphere is preferably an inert gas atmosphere, but it may be an oxidizing atmosphere such as the air. Cooling may be carried out properly in the air or in a furnace. And the heat treatment may be conducted by a plurality of steps.

Incidentally, since the magnetic core of the present invention is produced through a glass bonding process, the heat treatment can be conducted at the same time of glass bonding.

The heat treatment can be carried out in a magnetic field to provide the alloy with magnetic anisotropy.

The magnetic field need not be applied always during the heat treatment, and it is necessary only when the alloy is at a temperature lower than the Curie temperature Tc thereof. In the present invention, the alloy layer has an elevated Curie temperature because of crystallization than the amorphous counterpart, and so the heat treatment in a magnetic field can be carried out at temperatures higher than the Curie temperature of the corresponding amorphous alloy. In a case of the heat treatment in a magnetic field, it may be carried out by two or more steps. Also, a rotational magnetic field can be applied during the heat treatment to make the alloy layer magnetically isotropic.

The present invention will be explained in detail by the following Examples, without intention of restricting the scope of the present invention.

EXAMPLE 1

A 2-μm-thick alloy layer having the composition of $Fe_{99.5-x}Ru_{0.5}B_x$ by atomic % was produced on a Fotoceram substrate by using a magnetron sputtering apparatus. The X-ray diffraction of the resulting alloy layer showed that the alloy layer contained crystalline particles consisting of an Fe solid solution of a bcc structure, and the transmission electron microscopic observation showed that each crystalline particle had a maximum particle size of 500Å or less. Table 1 shows the saturation magnetic flux density Bs and saturation magnetostriction λs of the alloy layers.

TABLE 1

| x (atomic %) | Bs (kG) | λs ($\times 10^{-6}$) |
|---|---|---|
| 2 | 20.8 | −3.7 |
| 4 | 20.4 | −1.2 |
| 6 | 19.8 | −0.2 |
| 8 | 19.0 | +1.4 |
| 10 | 18.0 | +3.0 |
| 12 | 16.7 | +3.7 |
| 1 | 21.0 | −4.5 |

It is clear from Table 1 that the alloy layer of the present invention had a high saturation magnetic flux density and small magnetostriction. When x exceeds 10%, the saturation magnetic flux density decreases, making it likely to become amorphous and increasing its magnetostriction.

EXAMPLE 2

Alloy layers of 2 μm in thickness having the compositions shown in Table 2 were produced by an ion beam sputtering method and heat-treated at 300° C. for 1 hour, and then measured with respect to $\mu e_{1M}$ at 1 MHz. Each of the resulting layers had crystalline particles of an Fe solid solution having a bcc structure, and the crystalline particle size was 500Å or less. The results are shown in Table 2. Incidentally, the corrosion resistance of each alloy layer after immersion in water for 3 days was also shown. In Table 2, A means "substantially not rusted", B "slightly rusted" and C "totally rusted."

TABLE 2

| No.* | Composition (at %) | $\mu e_{1M}$ | Corrosion Resistance |
|---|---|---|---|
| 1 | $Fe_{93}Ru_1B_6$ | 1200 | A |
| 2 | $Fe_{91.5}Cr_1Ru_1B_{6.5}$ | 1350 | A |
| 3 | $Fe_{93.5}Cr_1B_{5.5}$ | 1100 | A |
| 4 | $Fe_{95}Nb_1B_4$ | 950 | A |
| 5 | $Fe_{95}Nb_1Ru_1B_3$ | 900 | A |
| 6 | $Fe_{90}Ti_1Ru_2B_7$ | 1050 | A |
| 7 | $Fe_{89}Cr_3B_8$ | 980 | A |
| 8 | $Fe_{97}Zr_1B_2$ | 900 | B |
| 9 | $Fe_{90}Hf_1B_9$ | 960 | B |
| 10 | $Fe_{91}V_1Ru_1B_6C_1$ | 1000 | A |
| 11 | $Fe_{92}Ta_1B_6Si_1$ | 1210 | B |
| 12 | $Fe_{91}W_1B_6Al_2$ | 1230 | B |
| 13 | $Fe_{91}Mn_1Rh_1B_6Ga_1$ | 1220 | A |
| 14 | $Fe_{86}Pd_1B_8Al_5$ | 1280 | A |
| 15 | $Fe_{92}Os_1B_6In_1$ | 1200 | A |
| 16 | $Fe_{92}Ir_1B_6Sn_1$ | 1210 | A |
| 17 | $Fe_{89}Pt_1B_4C_6$ | 1280 | A |
| 18 | $Fe_{78}Si_9B_{13}$ |  | C |
| 19 | $Fe_{88}Si_{12}$ | 400 | C |

Note
Sample Nos. 18 and 19 are Comparative Examples.

It is clear from Table 2 that the alloy of the present invention had high permeability exceeding 900 at 1 MHz and relatively good corrosion resistance. Thus, it is highly suitable for magnetic heads for VTRs and computers.

EXAMPLE 3

A laminated layer consisting of an alloy layer of 1 μm in thickness having the composition as shown in Table 3 and an intermediate layer of $SiO_2$ was produced in the same manner as in Example 1, and measured with respect to permeability at 1 MHz and 10 MHz, respectively. The results are shown in Table 3. It was confirmed by X-ray diffraction that the resulting layer had fine crystalline particles of 200Å or less in particle size and composed of an Fe solid solution having a bcc structure.

TABLE 3

| No.* | Composition (at %) | $\mu e_{1M}$ | $\mu e_{10M}$ |
|---|---|---|---|
| 1 | $Fe_{90}Cr_{0.5}Ti_{0.5}Ru_3B_6$ | 1250 | 1250 |
| 2 | $Fe_{89.5}Ti_2Ru_2B_{5.5}Si_1$ | 1230 | 1230 |
| 3 | $Fe_{90.5}Nb_{0.5}Cr_{0.5}Ru_3B_{4.5}Ge_1$ | 1200 | 1190 |
| 4 | $Fe_{91}Zr_1Cr_1B_5Al_2$ | 1260 | 1260 |
| 5 | $Fe_{91}V_1Pd_1B_2C_5$ | 1200 | 1200 |
| 6 | $Fe_{88}Ru_5B_6Si_1$ | 1280 | 1270 |
| 7 | $Fe_{91}Rh_2B_5Si_1C_1$ | 1220 | 1210 |
| 8 | $Fe_{91}Cr_1B_8$ | 1200 | 1190 |
| 9 | $Fe_{91}Ti_1Cr_1B_5Si_2$ | 1220 | 1220 |
| 10 | $Fe_{88}Si_{12}$ | 400 | 390 |
| 11 | $Fe_{82}Ga_8Ge_{10}$ | 800 | 780 |

Note
Sample Nos. 10 and 11 are Comparative Examples.

It is clear from Table 3 that the alloy layer of the present invention had permeability exceeding 1000 at 1 MHz and 10 MHz. Since it has high permeability at high frequency and relatively good corrosion resistance, it is highly suitable for magnetic heads of high-density magnetic recording.

EXAMPLE 4

An alloy layer of 10 μm in thickness having the composition of $Fe_{94-y}Ru_yB_6$ ($y=0-7$) was produced on a model head by a sputtering method, and were subjected to a wear test at 20° C. and 90% humidity. The wear after 50 hour is shown in Table 4. Table 4 also shows the corrosion resistance measured by immersion in water for 3 days in the same manner as in Example 2.

TABLE 4

| y (atomic %) | Wear (μm) | Corrosion Resistance |
|---|---|---|
| 0 | 9.5 | C |
| 1 | 4.5 | B |
| 2 | 2.2 | B |
| 4 | 1.0 | A |
| 5 | 0.8 | A |
| 7 | 0.3 | A |

It is clear that the addition of Ru serves to decrease wear of the alloy layer and improve its corrosion resistance, thereby increasing the service life of the alloy layer when used for magnetic heads.

EXAMPLE 5

Figure 1:
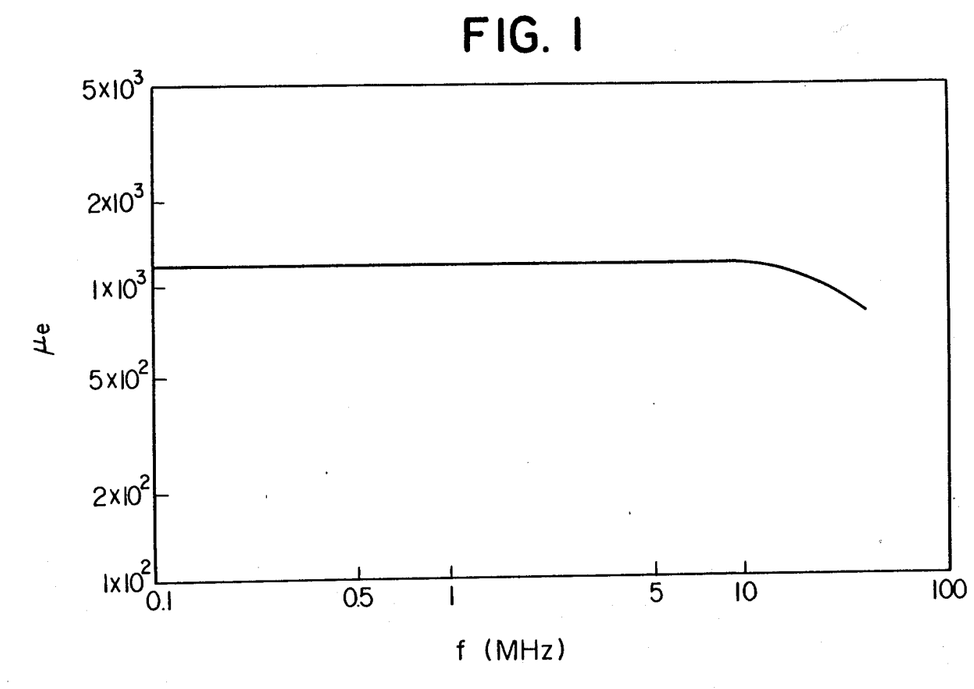
FIG. 1 is a graph showing the relation between effective permeability and frequency with respect to the magnetic head of the present invention.

An alloy layer of 3 μm in thickness having the composition of $Fe_{93}Cr_{0.5}Ru_1B_{5.5}$ was produced in the same manner as in Example 1 and heated at 350° C. for 1 hour in a rotating magnetic field and then cooled to room temperature at a cooling rate of 5° C./min. After that, it was measured with respect to the dependency of its effective permeability μe on frequency. FIG. 1 shows the dependency of its effective permeability on frequency. It is clear from FIG. 1 that the alloy layer of the present invention had high effective permeability at a high frequency region, so that it is suitable for magnetic heads.

EXAMPLE 6

Figure 2:
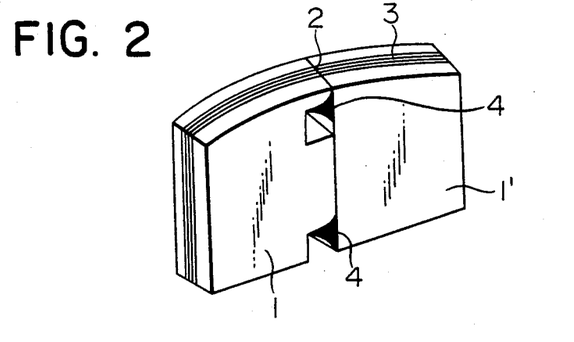
FIG. 2 is a perspective view showing the magnetic head of the present invention.

A magnetic head having a structure shown in FIG. 2 was produced. In a magnetic head, 1, 1' denote Fotoceram substrate cores, 2 a magnetic gap, 3 a laminated alloy layer and 4 bonding glass. The laminated alloy layer 3 contained alloy layers of the composition of $Fe_{91.9}Ru_2B_{6.1}$. For this magnetic head, recording and reproducing characteristics for a metal tape was measured. The results are shown in FIG. 3, in which A denotes the magnetic head of the present invention and B that made of ferrite.

Figure 3:
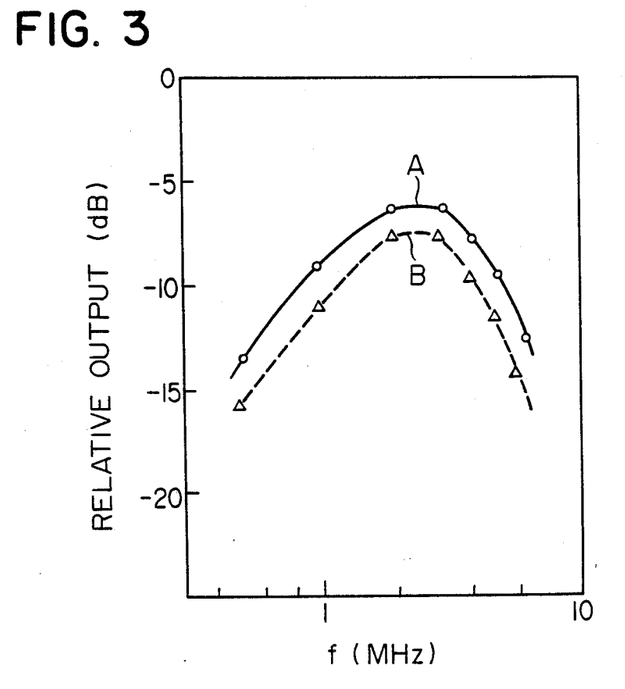
FIG. 3 is a graph showing the relations between relative output and frequency with respect to the magnetic heads of the present invention and a conventional magnetic head.

It is clear from FIG. 3 that the magnetic head containing the alloy layers of the present invention had better recording and reproducing characteristics than that of ferrite.

EXAMPLE 7

Figure 4:
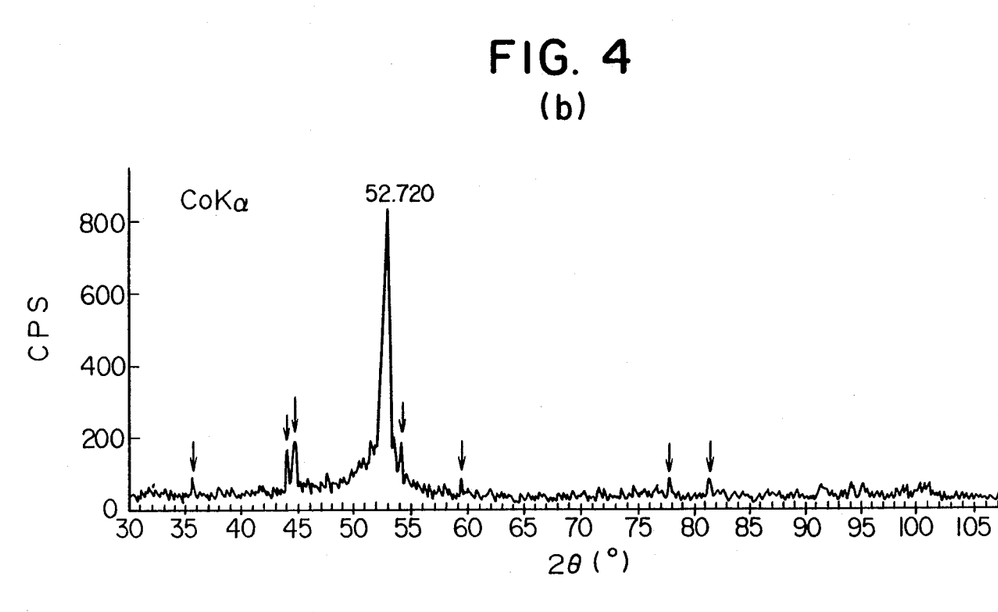
Figure 4A:
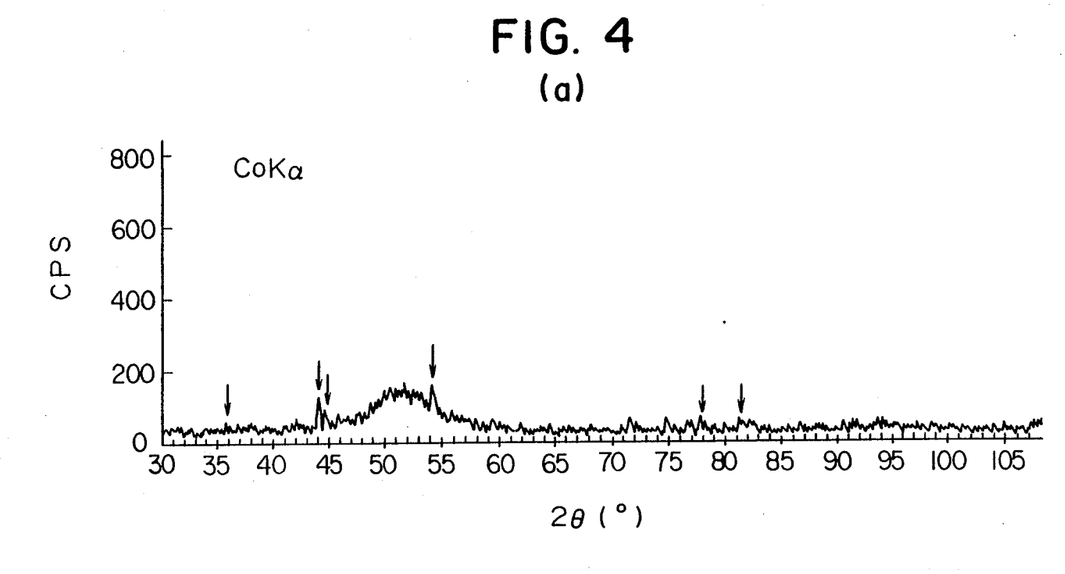

An amorphous alloy layer of 3 μm in thickness having the composition (by atomic %) consisting of 72.5% Fe, 0.9% Cu, 3.2% Nb, 10.8% Si and 12.6% B was produced in the same manner as in Example 1. The resulting alloy layer was measured by X-ray diffraction. As a result, a halo pattern peculiar to an amorphous alloy was obtained as shown in FIG. 4 (a). Incidentally, peaks shown by arrows are those from the substrate, not from the alloy layer.

Next, this amorphous alloy layer was heat-treated at 530° C. for 30 minutes in an $N_2$ gas atmosphere and then cooled to room temperature. The X-ray diffraction measurement was conducted. As a result, the halo pattern almost disappeared while crystal peaks appeared as shown in FIG. 4 (b). As a result of observation by a transmission electron microscope, at least 50% of the alloy structure was occupied by fine crystalline particles each having a maximum diameter of 100-200Å. It was confirmed by X-ray diffraction that these crystalline particles were composed of an Fe solid solution having a bcc structure.

Next, this alloy layer was measured by a vibration-type magnetometer (VSM) to know its hyteresis curve. As a result, its Bs was 13.2 kG and its Hc was 1.0 Oe. The effective permeability $μe_{1M}$ at 1MHz was also measured by an LCR meter. As a result, its $μe_{1M}$ was 1200.

EXAMPLE 8

Alloy layers having the compositions shown in Table 5 were produced in the same manner as in Example 7 and measured with respect to a saturation magnetic flux density Bs, effective permeability $μe_{1M}$ at 1MHz. The results are shown in Table 5.

TABLE 5

| No.* | Composition (at %) | Bs (kG) | $μe_{1M}$ |
|---|---|---|---|
| 1 | $Fe_{74.3}Cu_{1.0}Nb_{2.1}Si_{13.5}B_{9.1}$ | 12.6 | 1800 |
| 2 | $Fe_{71.9}Cu_{0.9}Nb_{3.2}Si_{15.1}B_{8.9}$ | 12.2 | 1800 |
| 3 | $Fe_{73.3}Cu_{1.1}Nb_{3.1}Si_{10.5}B_{12.0}$ | 13.3 | 1200 |
| 4 | $Fe_{73.5}Cu_{1.0}Nb_{2.9}Si_{15.5}B_{7.1}$ | 12.3 | 2100 |
| 5 | $Fe_{73.6}Cu_{0.8}Nb_{3.0}Si_{18.5}B_{4.1}$ | 11.7 | 1400 |
| 6 | $Fe_{75.5}Cu_{1.0}Nb_{3.0}Si_{13.5}B_{7.0}$ | 13.3 | 1750 |
| 7 | $Fe_{70.4}Cu_{1.1}Nb_{3.0}Si_{15.5}B_{10.0}$ | 11.3 | 1970 |
| 8 | $Fe_{67.7}Cu_{0.8}Nb_3Si_{16.5}B_{12}$ | 10.2 | 1560 |
| 9 | $Fe_{71.6}Cu_{0.9}Nb_5Si_{15.5}B_7$ | 10.6 | 2200 |
| 10 | $Fe_{71.3}Cu_{1.1}Nb_{5.1}Si_{10.5}B_{12}$ | 11.8 | 1350 |
| 11 | $Fe_{70.8}Cu_{1.5}Mo_{5.2}Si_{13.5}B_9$ | 10.8 | 800 |
| 12 | $Fe_{70.5}Cu_{2.0}Mo_{5.0}Si_{13.5}B_9$ | 10.6 | 750 |
| 13 | $(Fe_{0.93}Co_{0.07})_{73.2}Cu_{1.1}Nb_{3.1}Si_{13.5}B_{9.1}$ | 13.2 | 1200 |
| 14 | $(Fe_{0.93}Co_{0.07})_{73.3}Cu_{1.2}Nb_{3.0}Si_{13.5}B_{9.0}$ | 12.1 | 1260 |
| 15 | $Fe_{79.7}Cu_{1.1}Nb_{10.0}B_{9.2}$ | 10.3 | 1150 |
| 16 | $Fe_{73.3}Cu_{1.1}W_{3.1}Si_{13.6}B_{8.9}$ | 12.1 | 1760 |
| 17 | $Fe_{73.2}Cu_{1.2}Mo_{3.1}Si_{13.4}B_{9.1}$ | 12.3 | 1800 |
| 18 | $Fe_{73.2}Cu_{0.9}Ta_{3.2}Si_{13.6}B_{9.1}$ | 11.7 | 1780 |
| 19 | $Fe_{73.4}Cu_{1.1}Zr_{3.0}Si_{13.0}B_{9.5}$ | 12.6 | 1690 |
| 20 | $Fe_{73.3}Cu_{1.2}Hf_{3.0}Si_{12.9}B_{9.6}$ | 12.0 | 1720 |
| 21 | $Fe_{74.5}Si_{17.9}Al_{7.6}$ | 10.3 | 1500 |
| 22 | $Fe_{87.5}Si_{12.5}$ | 17.6 | 400 |
| 23 | $Fe_{74.6}Nb_{2.9}Si_{13.5}B_{9.0}$ | Nearly 10.0 | 20 |

Note
Sample Nos. 21 and 23 are Comparative Examples.

It is clear from Table 5 that the alloy layers of the present invention are superior to an Fe-Si-Al alloy layer in a saturation magnetic flux density, and that with respect to permeability $μe_{1M}$, both layers are substantially equivalent. The saturation magnetic flux densities of the alloy layers of the present invention are lower than that of an Fe-Si alloy layer, but their effective permeability $μe_{1M}$ is much higher that of the Fe-Si alloy layer. Therefore, the alloy layer of the present invention can provide magnetic heads suitable for high-coercivity recording media.

EXAMPLE 9

Alloy layers having the compositions shown in Table 6 were produced in the same manner as in Example 7 and measured with respect to a saturation magnetic flux density and saturation magnetostriction λs. The results are shown in Table 6.

TABLE 6

| No.* | Composition (at %) | Bs (kG) | λs ($\times 10^{-6}$) |
|---|---|---|---|
| 1 | $Fe_{73.4}Cu_{1.0}Nb_{3.1}Si_{13.5}B_{9.0}$ | 12.3 | +1.9 |
| 2 | $Fe_{69.7}Cu_{1.1}Nb_{3.0}Si_{17.2}B_{9.0}$ | 11.1 | +0.8 |
| 3 | $Fe_{73.4}Cu_{1.0}Nb_{3.1}Si_{18.5}B_{4.0}$ | 11.7 | −1.6 |
| 4 | $Fe_{73.3}Cu_{1.1}Nb_{3.1}Si_{17.5}B_{5.0}$ | 11.8 | −0.1 |

TABLE 6-continued

| No.* | Composition (at %) | Bs (kG) | λs (×10⁻⁶) |
|---|---|---|---|
| 5 | $Fe_{73.5}Cu_{0.9}Nb_{3.1}Si_{16.5}B_{6.0}$ | 11.9 | +0.2 |
| 6 | $Fe_{73.4}Cu_{1.1}Nb_{3.0}Si_{10.5}B_{12.0}$ | 13.3 | +4.1 |
| 7 | $Fe_{73.3}Cu_{1.1}Nb_{3.0}Si_{19.5}B_{3.1}$ | 11.4 | −0.6 |
| 8 | $(Fe_{0.96}Ni_{0.04})_{73.4}Cu_{1.0}Nb_{3.1}Si_{13.5}B_9$ | 12.4 | +5.0 |
| 9 | $(Fe_{0.93}Co_{0.07})_{73.4}Cu_{1.0}Nb_{3.1}Si_{13.5}B_9$ | 13.2 | +5.4 |
| 10 | $Fe_{74.4}Cu_{1.0}Nb_{2.1}Si_{13.5}B_{9.1}$ | 12.6 | +4.9 |
| 11 | $Fe_{71.4}Cu_{1.0}Nb_{5.0}Si_{13.6}B_{9.0}$ | 11.1 | +0.6 |
| 12 | $Fe_{73.3}Cu_{1.1}Nb_{3.0}Si_{17.1}B_{5.5}$ | 11.9 | Nearly 0 |
| 13 | $Fe_{73.5}Cu_{1.0}Mo_3Si_{13.5}B_9$ | 12.1 | +4.3 |
| 14 | $Fe_{73.2}Cu_{1.0}Ta_{3.1}Si_{16.6}B_{6.1}$ | 11.3 | −0.2 |
| 15 | $Fe_{73.1}Cu_{1.0}W_{3.2}Si_{13.6}B_{9.1}$ | 12.1 | +4.4 |
| 16 | $Fe_{69.8}Ni_{7.7}Si_{13.5}B_9$ Amorphous | 14.2 | +29 |
| 17 | $Fe_{84.2}Si_{9.6}Al_{6.2}$ (wt %) | 11.0 | Nearly 0 |

Note
Sample Nos. 16 and 17 are Comparative Examples.

The alloy layers of the present invention had saturation magnetic flux densities Bs of 10 kG or more and saturation magnetostriction λs close to 0. Accordingly, they are less susceptible to strain which may be caused by the difference in a thermal expansion coefficient between the alloy layer and the substrate in the process of forming the alloy layer. Thus, magnetic heads produced by using such alloy layers suffer from substantially no deterioration of magnetic characteristics.

EXAMPLE 10

Alloy layers having the compositions shown in Table 7 were produced in the same manner as in Example 7, and measured with respect to effective permeability $\mu e_{1M}$ at 1MHz. Next, each of these alloy layers was tested with respect to corrosion resistance by immersion in water for 1 week. The results are shown in Table 7, in which A means "substantially no rust", B "slight rust", C "thick rust all over the alloy layer", and D "extreme corrosion to such an extent that the alloy layer almost disappeared."

TABLE 7

| No.* | Composition (at %) | $\mu e_{1M}$ | Corrosion Resistance |
|---|---|---|---|
| 1 | $Fe_{72.3}Cu_{1.1}Nb_{3.0}Si_{15.1}B_{5.5}Cr_{3.0}$ | 1420 | A |
| 2 | $Fe_{69.5}Ag_{1.2}Nb_{5.1}Si_{15.0}B_{6.1}Ru_{3.1}$ | 1410 | A |
| 3 | $Fe_{70.9}Cu_{1.4}Nb_{3.2}Si_{14.1}B_{7.1}C_{3.3}$ | 1210 | B |
| 4 | $Fe_{68.3}Cu_{1.3}Ta_{4.1}Si_{15.0}B_{8.2}Au_{2.0}P_{1.1}$ | 1120 | B |
| 5 | $Fe_{71.5}Ag_{1.2}Ti_{5.2}Si_{14.0}B_{7.0}Zn_{1.1}$ | 1170 | A |
| 6 | $Fe_{69.5}Cu_{3.1}W_{5.3}Si_{14.5}B_{6.5}Sn_{1.1}$ | 1280 | C |
| 7 | $Fe_{78.3}Cu_{1.0}Ag_{0.5}Nb_{10.1}B_{9.0}Re_{1.1}$ | 1030 | A |
| 8 | $Fe_{69.5}Cu_{2.1}Ta_{5.2}Si_{14.1}B_{8.0}Mg_{1.1}$ | 1180 | B |
| 9 | $Fe_{67.8}Cu_{1.1}Mo_{5.3}Si_{14.9}B_{8.8}Ca_{1.1}C_{1.0}$ | 1170 | B |
| 10 | $Fe_{71.8}Cu_{1.8}Nb_{3.2}Si_{15.0}B_{4.1}Sr_{1.1}Ge_{3.0}$ | 1220 | B |
| 11 | $Fe_{70.3}Ag_{1.5}Hf_{5.1}Si_{13.0}B_{9.1}Ba_{1.0}$ | 1170 | C |
| 12 | $Fe_{69.2}Cu_{1.0}Nb_{10.1}Si_{10.0}B_{8.1}Mn_{1.1}Y_{0.5}$ | 1180 | A |
| 13 | $Fe_{67.5}Cu_{1.1}Nb_{5.2}Si_{14.1}B_{7.1}Al_{5.0}$ | 1340 | A |
| 14 | $Fe_{66.2}Ag_{2.0}Ta_{4.8}Si_{15.1}B_{8.8}Pt_{3.1}$ | 1190 | A |
| 15 | $Fe_{67.0}Cu_{0.9}Mo_{3.9}Si_{17.5}B_{7.5}Rh_{3.2}$ | 1310 | A |
| 16 | $Fe_{68.8}Cu_{4.0}Zr_{5.1}Si_{13.1}B_{7.0}Os_{2.0}$ | 1050 | B |
| 17 | $Fe_{67.6}Cu_{1.1}Nb_{8.0}Zr_{7.1}Si_{9.0}B_{5.1}Pd_{2.1}$ | 1010 | A |
| 18 | $Fe_{77.7}Si_{9.2}B_{13.1}$ Amorphous | — | D |
| 19 | $Fe_{87.5}Si_{12.5}$ | 400 | D |

Note
Sample Nos. 18 and 19 are Comparative Examples.

As is clear from Table 7, the alloy layers for the magnetic heads of the present invention showed corrosion resistance higher than that of the conventional Fe-base alloy layers, and particularly those containing Cr, platinum-group elements, Nb or Ti showed excellent corrosion resistance. Incidentally, they had effective permeability exceeding 1000 at 1MHz.

EXAMPLE 11

Each alloy layer of 15 μm in thickness having the composition shown in Table 8 was produced on the model head in the same manner as in Example 7 and mounted in a tape recorder to conduct a wear test. The wear of each alloy layer after 50 hours under the conditions of 20° C. and 90% RH is shown in Table 8.

TABLE 8

| No.* | Composition (at %) | Wear (μm) |
|---|---|---|
| 1 | $Fe_{68.0}Cu_{1.1}Nb_{5.2}Si_{15.5}B_{7.1}Ru_{3.1}$ | 0.5 |
| 2 | $Fe_{65.8}Cu_{0.8}Nb_{4.8}Si_{17.5}B_{6.0}Cr_1Ru_{4.1}$ | 0.3 |
| 3 | $Fe_{68.5}Ag_{0.9}Nb_{3.0}Si_{16.5}B_{7.0}Sc_{1.1}Al_{3.0}$ | 2.8 |
| 4 | $Fe_{60.8}Cu_{1.2}Nb_{4.3}Si_{19.5}B_{6.1}Cr_{1.0}Al_{7.1}$ | 1.5 |
| 5 | $Fe_{65.4}Cu_{1.4}Ti_{7.0}Si_{14.0}B_{8.7}Sm_{0.5}Rh_3$ | 1.0 |
| 6 | $Fe_{68.6}Cu_{1.6}Ta_{5.1}Si_{14.7}B_{8.5}Nd_{0.5}Pt_1$ | 1.2 |
| 7 | $Fe_{66.6}Cu_{1.0}Nb_{7.1}Si_{15.3}B_{7.4}Gd_{0.6}Ge_2$ | 1.8 |
| 8 | $Fe_{66.9}Cu_{1.1}W_{3.2}Si_{18.0}B_{7.3}Tb_{0.5}Ru_3$ | 0.8 |
| 9 | $Fe_{68.1}Ag_{1.1}Nb_{3.5}Zr_{1.5}Si_{17.8}B_{5.8}Dy_{0.2}Au_2$ | 1.2 |
| 10 | $Fe_{68.9}Cu_{1.5}Nb_{5.2}Si_{16.1}B_{6.1}V_{1.1}C_{1.1}$ | 2.9 |
| 11 | $Fe_{69.9}Cu_{1.1}Ag_{0.5}Nb_{3.1}Ta_{2.4}Si_{14.8}B_{6.2}Ir_2$ | 0.7 |
| 12 | $Fe_{69.9}Cu_{0.8}Nb_{4.1}Si_{15.0}B_{7.2}Ru_2Re_1$ | 0.6 |
| 13 | Permalloy | 10.8 |
| 14 | $Co_{83}Nb_{10}Zr_7$ Amorphous | 2.9 |

Note
Sample Nos. 13 and 14 are Comparative Examples.

As is clear from Table 8, the Fe-base soft magnetic alloy layer of the present invention showed wear resistance equal to or higher than that of the conventional soft magnetic layers. Particularly those containing platinum-group elements or Cr, etc. underwent only slight wear.

EXAMPLE 12

An amorphous alloy layer of 3 μm in thickness having the composition of $Fe_{73.2}Cu_{1.1}Nb_{3.2}Si_{16.5}B_{6.0}$ was produced in the same manner as in Example 7 and heat-treated at a temperature shown in Table 9 for 1 hour and then cooled to room temperature. For each alloy layer, saturation magnetostriction λs, coercive force Hc, and effective permeability $\mu e_{1M}$ at 1MHz were measured. Also, the alloy layer pealed off from the substrate was observed by a transmission electron microscope. The results are shown in Table 9.

TABLE 9

| No. | Heat Treatment Temperature (°C.) | λs (×10⁻⁶) | Hc (Oe) | $\mu e_{1M}$ |
|---|---|---|---|---|
| 1 | NO | +20.8 | 20 | |
| 2 | 470 | +16.3 | 7.8 | |
| 3 | 500 | +4.6 | 2.0 | 610 |
| 4 | 510 | −1.8 | 1.3 | 1010 |
| 5 | 530 | +0.4 | 0.6 | 1380 |
| 6 | 550 | +1.3 | 1.2 | 1020 |
| 7 | 600 | −0.3 | 1.4 | 1000 |

The transmission electron microscopic observation showed that 50% or more of the alloy structure was composed of fine crystalline particles having an average particle size of 100-200Å when heat-treated at a temperature of 500° C. or more. Such alloy structure leads to extremely small magnetostriction λs and small coercive force Hc while increasing effective permeability $\mu e_{1M}$.

EXAMPLE 13

An amorphous alloy layer of 3 μm in thickness having the composition of $Fe_{74.1-x}Cu_xNb_{3.1}Si_{13.6}B_{9.2}$ was produced on a Fotoceram substrate by using a 4-polar sputtering apparatus. Each alloy layer was heat-treated at 530° C. for 1 hour in a rotating magnetic field and then cooled to room temperature. Their effective permeability $\mu e_{1M}$ at 1MHz were measured. The results are shown in Table 10.

TABLE 10

| x (atomic %) | $\mu e_{1M}$ |
|---|---|
| 0 | 20 |
| 0.10 | 400 |
| 0.52 | 600 |
| 1.2 | 1340 |
| 1.5 | 1300 |
| 2.1 | 1280 |
| 3.0 | 1200 |

As is clear from Table 10, the addition of Cu serves to increase $\mu e_{1M}$. Further, the transmission electron microscopic observation showed that 50% or more of the alloy structure of the alloy layer containing Cu had fine crystalline particles having an average particle size of 500Å or less.

EXAMPLE 14

An amorphous alloy layer of 3 μm in thickness having the composition of $Fe_{76.8-\alpha}Ag_{1.1}Si_{15.1}B_{7.0}Nb_\alpha$ was produced on a Fotoceram substrate by using a magnetron sputtering apparatus and heat-treated at 550° C. for 1 hour. Their effective permeability $\mu e_{1M}$ at 1MHz are shown in Table 11.

TABLE 11

| α (atomic %) | $\mu e_{1M}$ |
|---|---|
| 0 | 20 |
| 2 | 1600 |
| 3 | 2100 |
| 5 | 2000 |
| 7 | 1900 |

It is clear that the addition of Nb serves to extremely increase $\mu e_{1M}$. The transmission electron microscopic observation showed that the alloy containing Nb had an alloy structure, at least 50% of which was composed of fine crystalline particles having an average particle size of 500Å or less.

EXAMPLE 15

An alloy layer having the composition of $Fe_{71.1}Cu_{1.0}Nb_{5.2}Si_{15.5}B_{7.2}$ was produced on a Fotoceram substrate and was measured with respect to effective permeability $\mu e_{1M}$ at 1MHz. Next, it was heat-treated at 550° C. for 1 hour and cooled to room temperature to know the variation of $\mu e_{1M}$. For comparison, the same test was conducted on the Co-Nb-Zr amorphous alloy layer. The results are shown in Table 12.

TABLE 12

| | $\mu e_{1M}$ | |
|---|---|---|
| Alloy Layer | Before Heat Treatment | After Heat Treatment |
| Present Invention | 2200 | 2100 |
| Co—Nb—Zr Amorphous | 2180 | 420 |

As is clear from Table 12, the alloy layer of the present invention showed only small deterioration of effective permeability even at a temperature exceeding 500° C. This means that glass bonding can be effectively conducted to provide highly reliable magnetic heads by using such alloy. On the other hand, the Co-Nb-Zr amorphous layer showed extremely deteriorated permeability because of crystallization, meaning that it imposes restrictions on the process of manufacturing magnetic heads.

EXAMPLE 16

Figure 5:
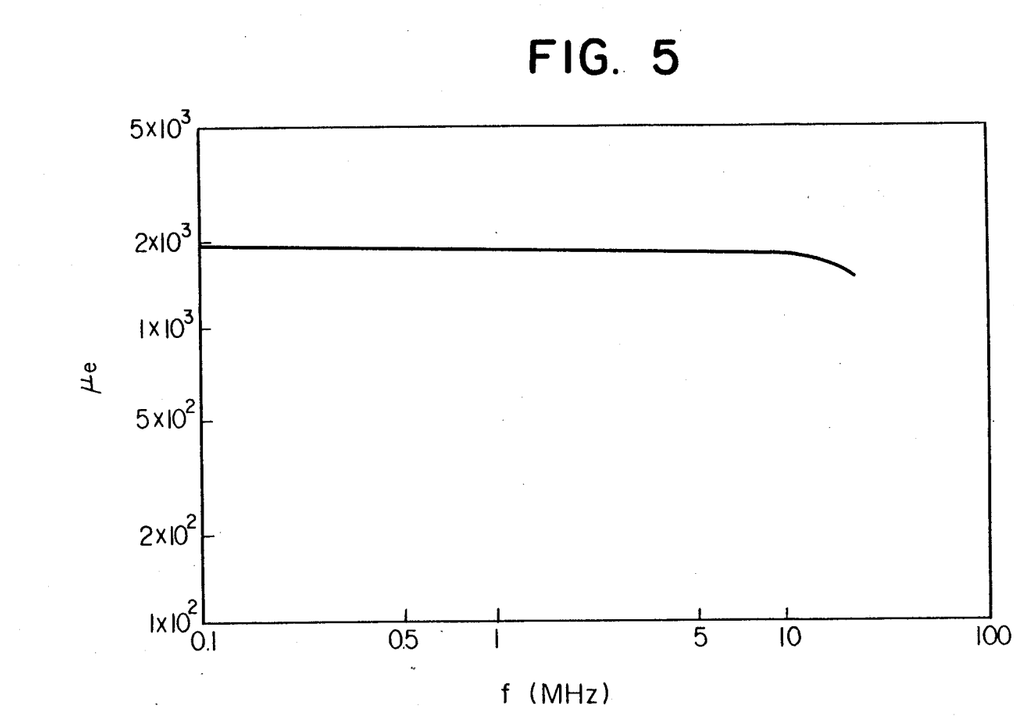
FIG. 5 is a graph showing the relation between effective permeability and frequency with respect to the magnetic head of the present invention.

An amorphous alloy layer of the present invention having a thickness of 3 μm and the composition of $Fe_{72.7}Cu_{1.1}Nb_{3.2}Si_{16.5}B_{6.5}$ was produced on a Fotoceram substrate and measured with respect to dependency of effective permeability on frequency. The results are shown in FIG. 5. Thus, it was confirmed that the alloy layer of the present invention had high permeability in a wide range of frequency and so is highly suitable for magnetic heads for VTRs and computer memories.

EXAMPLE 17

A magnetic head having the structure shown in FIG. 2 was produced by using an alloy layer of $Fe_{69.9}Cu_{1.2}Nb_{5.2}Si_{15.5}B_{7.1}Ru_{1.1}$, and its recording-reproducing characteristics were evaluated. Similar results to those shown in FIG. 3 were obtained.

The present invention has been described by the above Examples, but it should be noted that any modifications can be made unless they deviate from the scope of the present invention defined by the claims attached hereto.

What is claimed is:

1. A magnetic head having a magnetic path which contains at least one magnetic gap in its magnetic path, wherein the magnetic path comprises an Fe-base soft magnetic alloy layer, with at least 50% of the structure of said alloy layer consisting of fine crystalline particles having a body-centered cubic structure and an average particle size of 500Å or less.

2. The magnetic head according to claim 1, wherein the balance of said alloy structure is substantially amorphous.

3. The magnetic head according to claim 1, wherein said alloy structure substantially consists of fine crystalline particles.

4. The magnetic head according to claim 1, wherein said Fe-base soft magnetic alloy layer has the composition of:

$Fe_{100-u-v}B_uL_v$ wherein L is at least one element selected from the group consisting of Ti, Zr, Hf, V, Nb, Ta, Cr, W, Mn, Ru, Rh, Pd, Os, Ir and Pt, and u and v respectively satisfy the following relations:

$2 \leq u \leq 10, 0 \leq v \leq 10$.

5. The magnetic head according to claim 4, wherein 10% or less of Fe is substituted by Co and/or Ni.

6. The magnetic head according to claim 4, wherein said v is 0.5–5.

7. The magnetic head according to claim 1, wherein said Fe-base soft magnetic alloy layer has the composition of:

$Fe_{100-u-v-w}B_uL_vX_w$ wherein L is at least one element selected from the group consisting of Ti, Zr, Hf, V, Nb, Ta, Cr, W, Mn, Ru, Rh, Pd, Os, Ir and Pt, X is at least one element selected from the group consisting of C, Si, Ge, Ga, Al, In and Sn, and u, v and w respectively satisfy the following relations:

$2 \leq u \leq 10$, $0 \leq v \leq 10$, $0 < w \leq 10$.

8. The magnetic head according to claim 7, wherein 10% or less of Fe is substituted by Co and/or Ni.

9. The magnetic head according to claim 7, wherein said v is 0.5-5 and said w is 5 or less.

10. The magnetic head according to claim 4 or 7, wherein said L in said composition is Ru.

11. The magnetic head according to claim 4 or 7, wherein said Fe-base soft magnetic alloy layer is laminated with a nonmagnetic or ferromagnetic layer alternately.

12. The magnetic head according to claim 1, wherein said Fe-base soft magnetic alloy layer has the composition represented by the general formula:

$$(Fe_{1-a}M_a)_{100-x-y-z-\alpha-\beta-\gamma}A_xSi_yB_zM'_\alpha M''_\beta X_\gamma$$

wherein M is Co and/or Ni, M' is at least one element selected from the group consisting of Nb, W, Ta, Zr, Hf, Ti and Mo, M'' is at least one element selected from the group consisting of V, Cr, Mn, Al, elements in the platinum group, Sc, Y, rare earth elements, Au, Zn, Sn, Re, Mg, Ca, Sr, Ba, Na, K and Rb, A is Cu and/or Ag, X is at least one element selected from the group consisting of C, Ge, P, Ga, Sb, In, Be, As, and N, and a, x, y, z, $\alpha$, $\beta$ and $\gamma$ respectively satisfy $0 \leq a \leq 0.5$, $0.1 \leq x \leq 10$, $0 \leq y \leq 30$, $0 \leq z \leq 25$, $0 \leq y+z+\gamma \leq 35$, $0.1 \leq \alpha \leq 30$, $0 \leq \beta \leq 15$ $0 \leq \gamma \leq 20$, at least 50% of the alloy structure being fine crystalline particles having an average particle size of 500Å or less.

13. The magnetic head according to claim 12, wherein said M' is at least one element selected from the group consisting of Nb, Mo and Ta.

14. The magnetic head according to claim 12, wherein said y, z, $\alpha$ and $\gamma$ satisfy:

$10 \leq y+z+\gamma \leq 35$, $0.1 \leq \alpha \leq 10$.

15. The magnetic head according to claim 14, wherein said y, z, $\alpha$ and $\gamma$ satisfy:

$0 \leq y+z+\gamma \leq 10$, $10 < \alpha \leq 30$.

16. The magnetic head according to claim 12, wherein said a, y, z and $\alpha$ respectively satisfy:

$0 \leq a \leq 0.3$, $0 \leq y \leq 25$, $2 \leq z \leq 25$, $15 \leq y+z \leq 30$, $0.1 \leq \alpha \leq 10$.

17. The magnetic head according to claim 12, wherein said a, x, y, z and $\alpha$ respectively satisfy:

$0 \leq a \leq 0.3$, $0.5 \leq x \leq 2$, $8 \leq y \leq 23$, $3 \leq z \leq 18$, $18 \leq y+z \leq 26$, $2 \leq \alpha \leq 8$.

18. The magnetic head according to claim 12, wherein said M'' is at least one element selected from the group consisting of Ru, Rh, Pd, Os, Ir, Pt, Au, Cr and V, and said $\beta$ satisfies:

$0 < \beta \leq 10$.

19. The magnetic head according to claim 12, wherein said x satisfies:

$0.5 \leq x \leq 2$.

20. The magnetic head according to claim 12, wherein said Fe-base soft magnetic alloy layer is laminated with a nonmagnetic or ferromagnetic layer alternately.

* * * * *